United States Patent [19]

Doyhamboure et al.

[11] Patent Number: 4,621,780
[45] Date of Patent: Nov. 11, 1986

[54] METHOD AND DEVICE FOR TEMPORARILY ENLARGING THE OPENING OR HATCH AREA OF A STRUCTURAL FRAME OF AN AIRCRAFT

[75] Inventors: Francois Doyhamboure, Merignac; Jean Morand, Bordeaux, both of France

[73] Assignee: Societe Nationale Industrielle Aerospatiale, Paris, France

[21] Appl. No.: 691,928

[22] Filed: Jan. 16, 1985

[30] Foreign Application Priority Data

Jan. 24, 1984 [FR] France ................ 84 01054

[51] Int. Cl.⁴ .................................................. B64C 1/22
[52] U.S. Cl. .................................. 244/118.2; 105/396; 244/119
[58] Field of Search ............... 244/118.1, 118.2, 118.3, 244/119, 137 R; 296/10, 24 R; 105/393, 396, 404, 411, 238 R, 355

[56] References Cited

U.S. PATENT DOCUMENTS 2,392,789 1/1946 Watter ........................... 244/118.1

FOREIGN PATENT DOCUMENTS 2303711 10/1976 France ........................... 244/118.1

Primary Examiner—Galen Barefoot
Assistant Examiner—Mark R. Valliere
Attorney, Agent, or Firm—Marshall, O'Toole, Gerstein, Murray & Bicknell

[57] ABSTRACT

The present invention relates to a method and device for temporarily enlarging the opening or hatch area of a structural frame of an aircraft. The invention proposes a fixture of smaller dimensions than the structural girder which is able to replace the latter temporarily during certain periods, in particular during loading and unloading of cargo. The invention finds an application in the fitting out of a transport aircraft.

9 Claims, 14 Drawing Figures

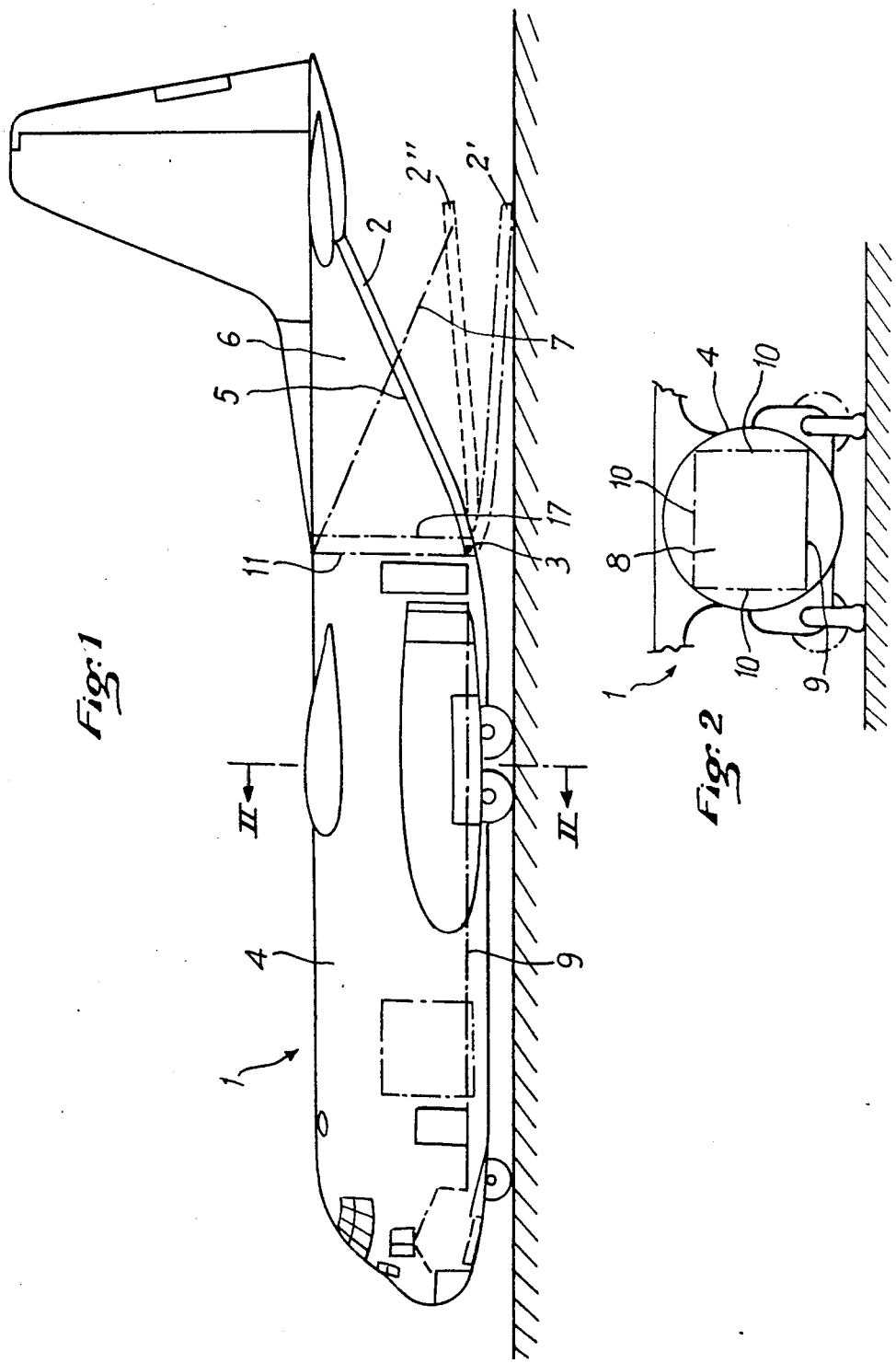

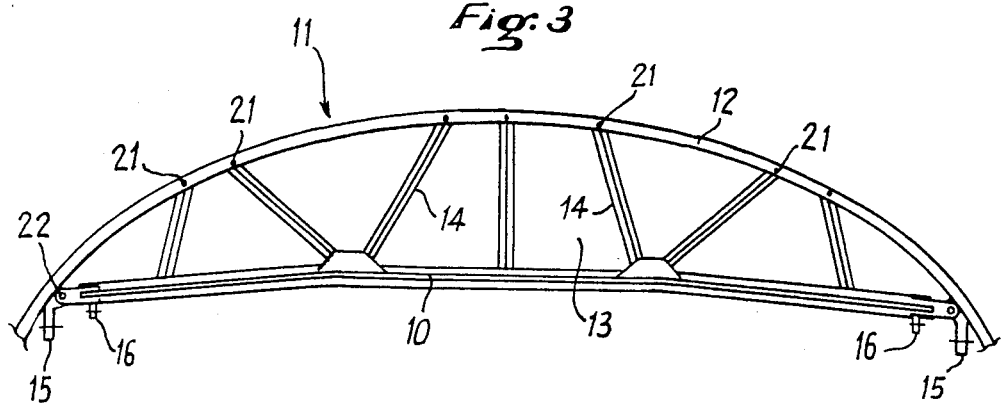
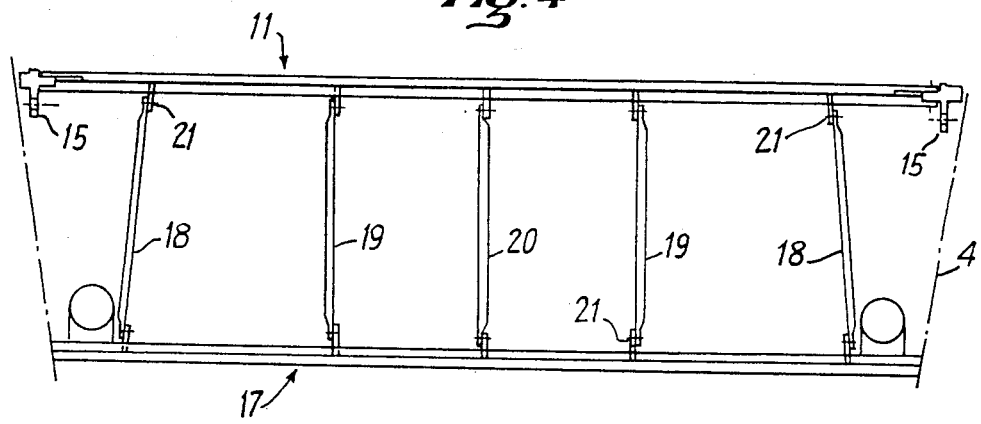
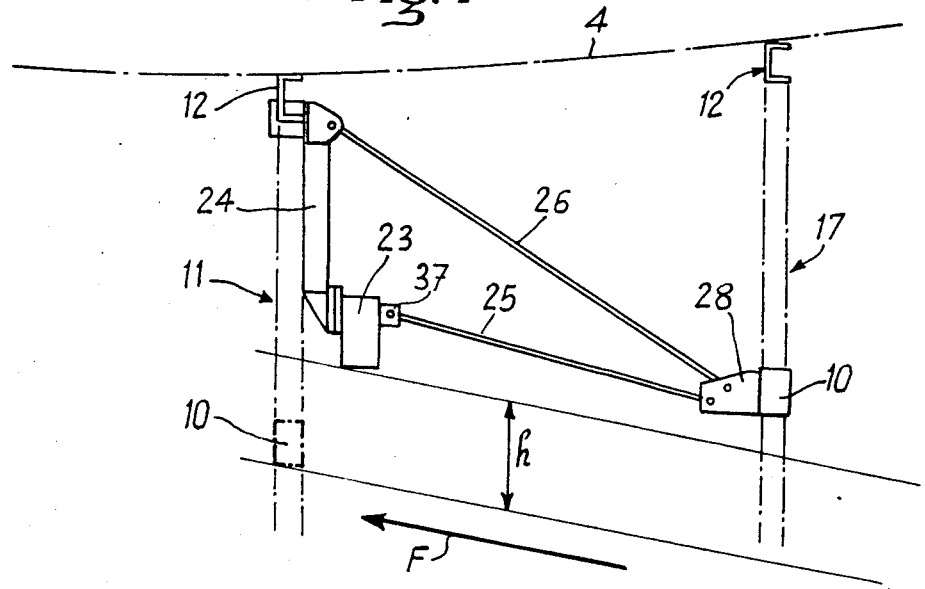

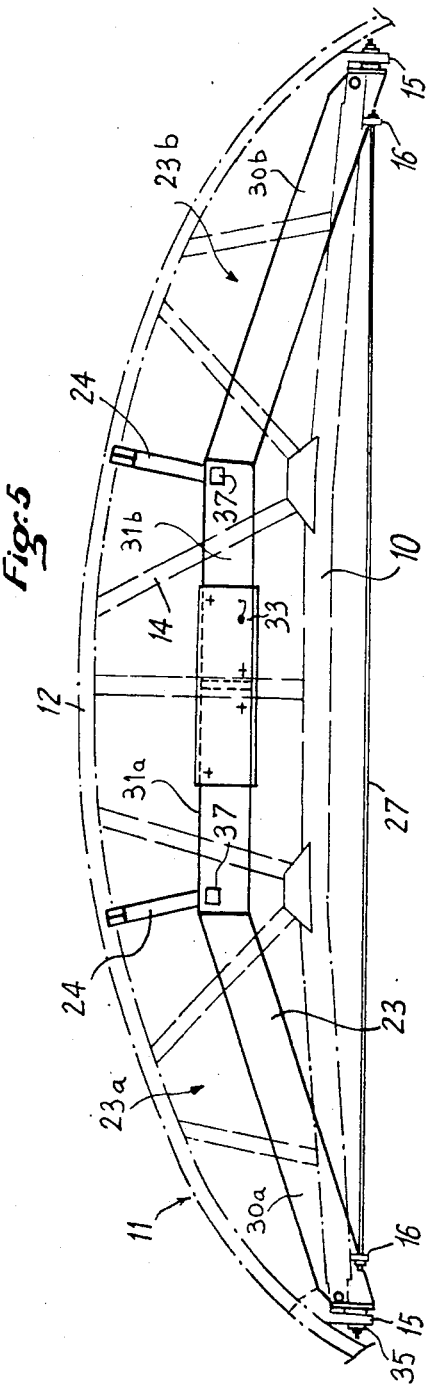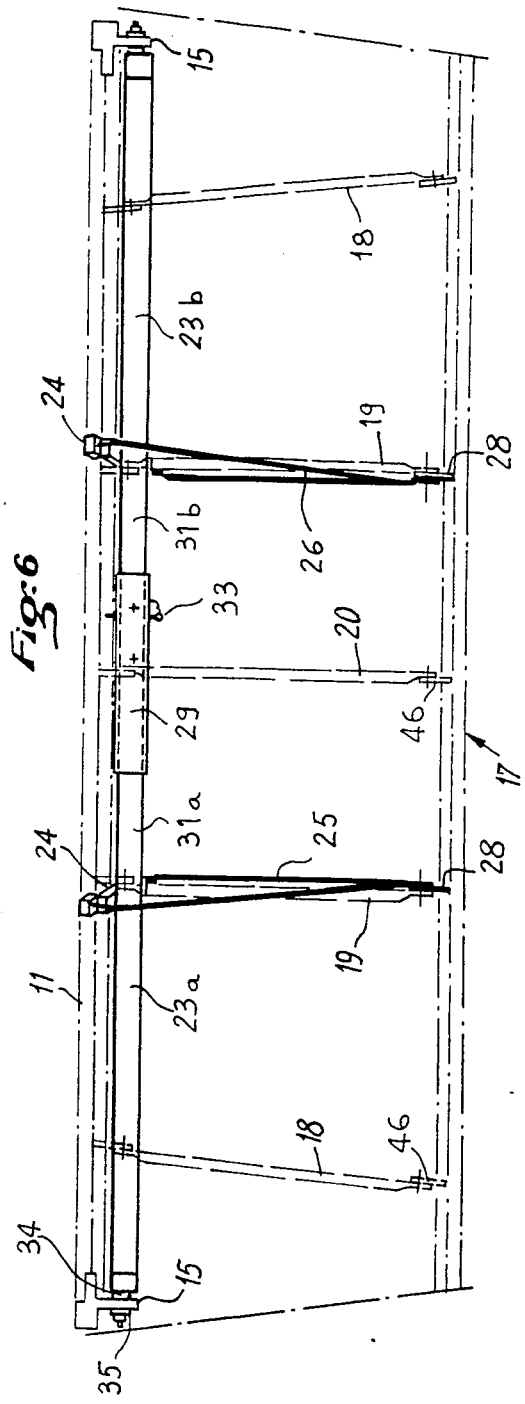

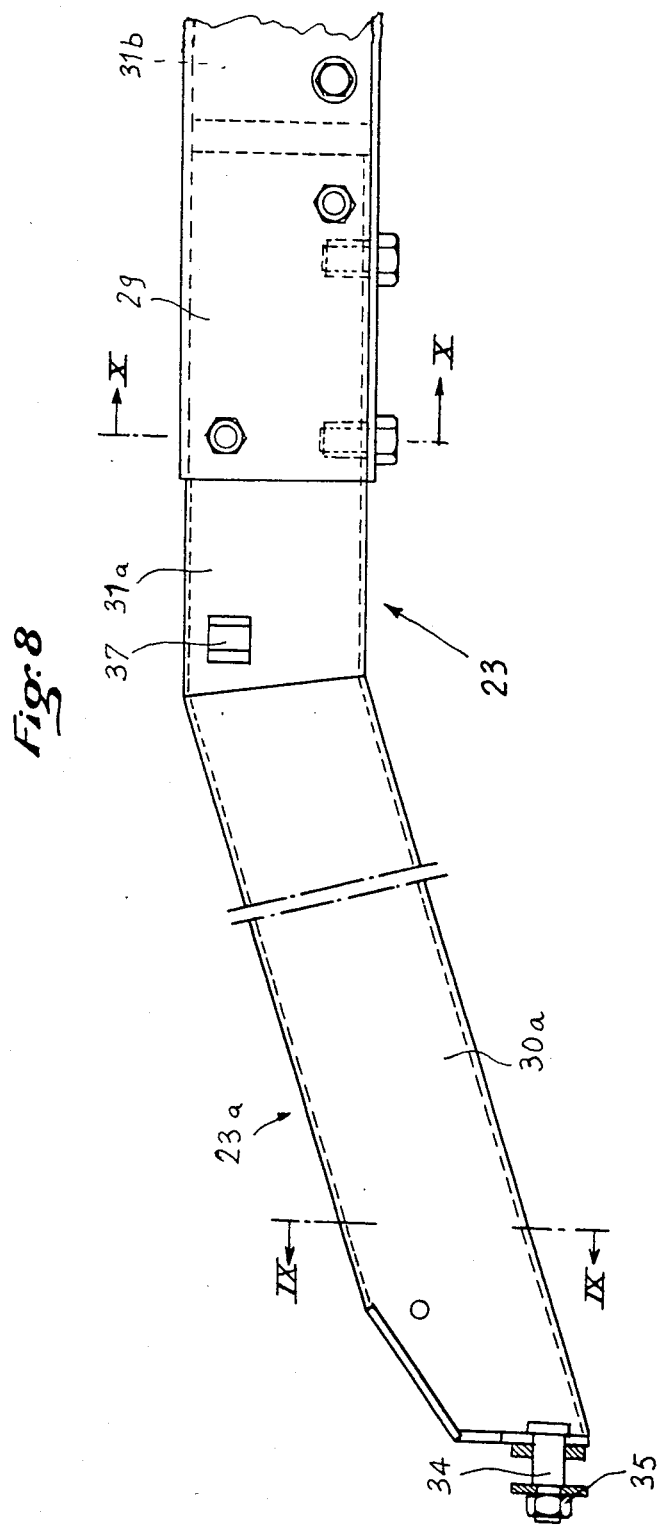

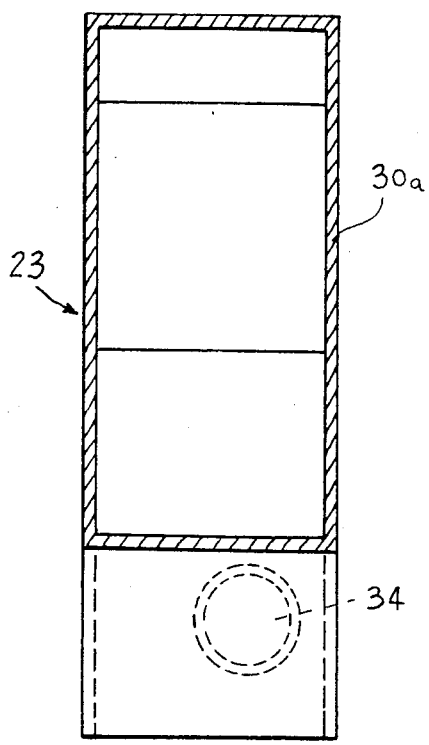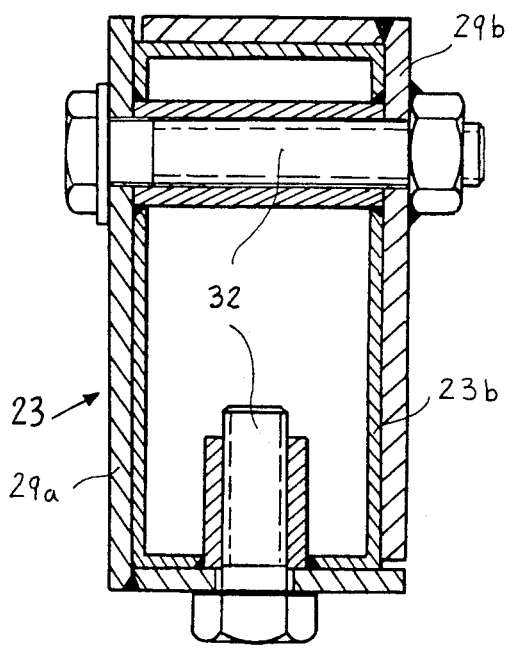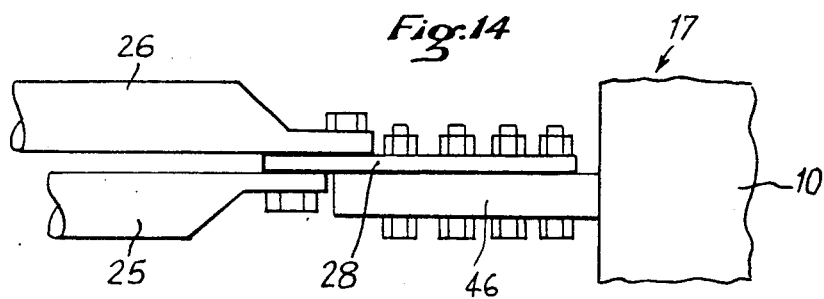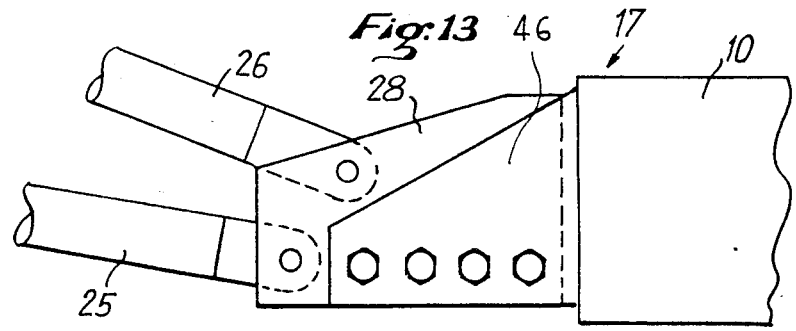

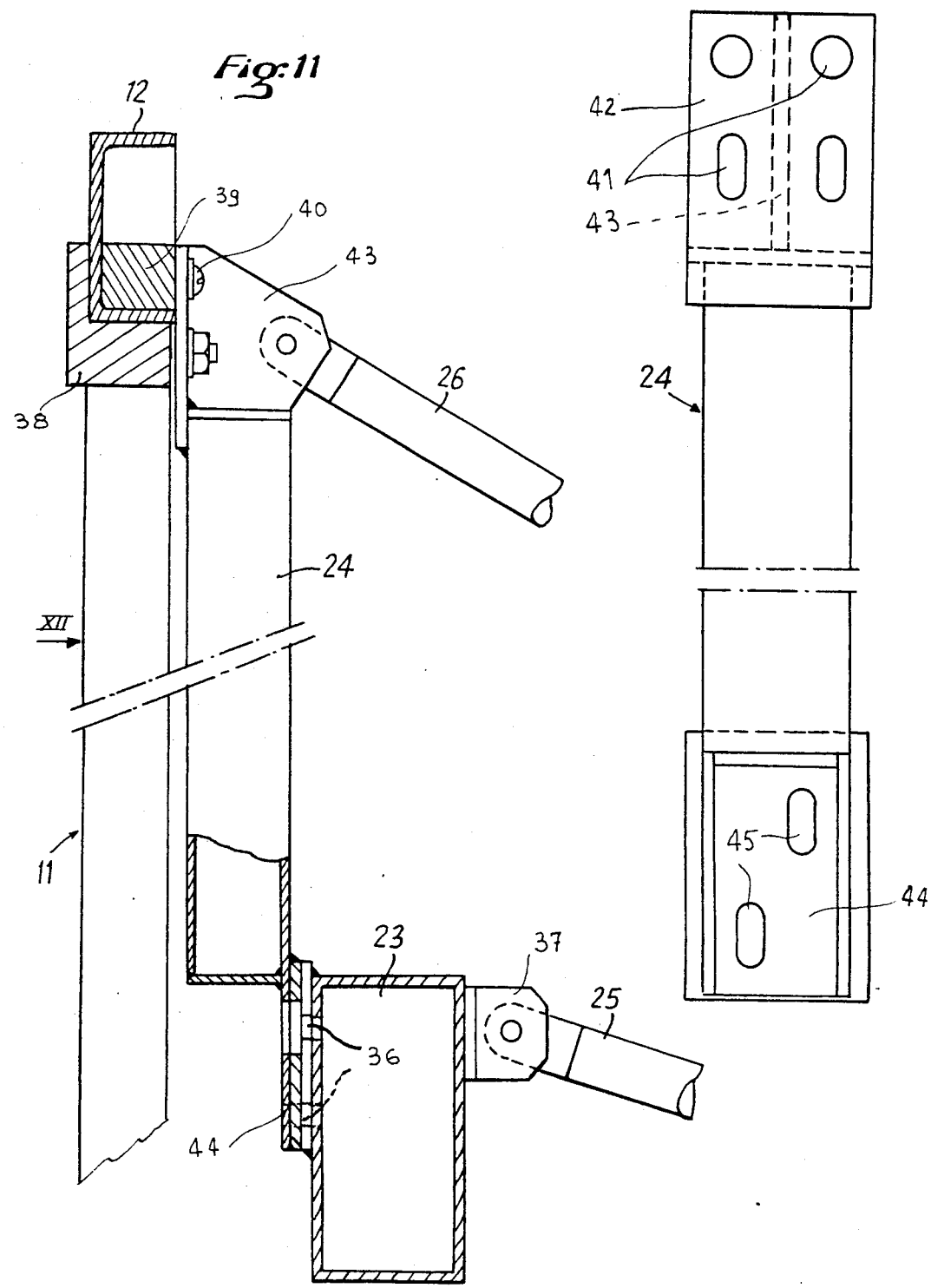

METHOD AND DEVICE FOR TEMPORARILY ENLARGING THE OPENING OR HATCH AREA OF A STRUCTURAL FRAME OF AN AIRCRAFT

The present invention relates to a method and device permitting to temporarily enlarge the opening or hatch area of the structural frames of an aircraft.

BACKGROUND OF THE INVENTION

The structure of an aircraft, as we know, comprises a plurality of spaced out transverse frames locked together with longerons, said structure being covered with the shell of the aircraft. Also, in certain cases, in particular in the case of transport aircrafts, some at least of the structural frames, which are required to have high mechanical strength, are constituted of an annular underframe generally formed by a curvilinear section and reinforced in parts by girders sub-tending parts of said underframe. While such girders confer to the corresponding frames is required mechanical strength properties, in order to enable the aircraft to withstand the most severe operating conditions, they also restrict the size of the central opening defined by said frames, hence the maximum dimensions of the cargo which can be loaded into the aircraft.

It often happens that certain cargoes cannot be loaded into a cargo plane because their overall size exceeds by a few centimeters the corresponding size of the hatch area. It may also happen, in the case of a transport aircraft with a rear door designed to serve as an inclined ramp for loading the cargo, that said cargo cannot go through the opening or hatch area of the structural frame situated vertically to the upper part of the ramp, just because of the inclination of said ramp, whereas the dimensions of the load would enable it to be loaded through said frame if the direction of introduction were horizontal instead of being upwardly inclined. In this case, the only thing would be to raise the nose of the transport aircraft so as to bring the ramp and the floor of the aircraft into alignment. This measure, besides being complicated and delicate, may even prove insufficient.

One solution to try and solve this problem, could be to permanently modify the girder or girders preventing the loading of the cargo; but this solution could only be applied with the consent of the constructor of the aircraft and would involve a revision of the aircraft certificate of airworthiness. Another solution could be to temporarily remove those frame girders in the way for loading or unloading a cargo; but then, as the aircraft structure is subjected to very high stresses on the ground, there could be a risk of unacceptable deformations and reductions of mechanical strength.

SUMMARY OF THE INVENTION

It is the object of the present invention to overcome these problems with a method for temporarily enlarging the opening or hatch area of an aircraft structural frame, particularly when loading or unloading a cargo, said structural frame being constituted of an annular underframe reinforced by at least one structural girder subtending part of said underframe, said method consisting:

in the case where said structural girder is fixed either completely or partly to the underframe by non-dismountable securing means, in first performing a permanent modification, consisting in replacing said non-dismountable securing means by removable securing means;

in providing a fixture adapted, on the one hand, to mechanically replace the structural girder or part thereof secured to said underframe by removable securing means, and on the other hand, enlarging the opening or hatch area of said frame according to requirements;

for those periods of time when a larger opening or hatch area is required for the frame, in replacing said structural girder or part thereof with said fixture; and at the end of the aforesaid period, in replacing said fixture by said structural girder or part thereof.

Thus according to the invention, it is possible to replace the structural girder or part thereof, made to be dismountable if it were not already, with a fixture permitting to obtain both the required mechanical strength and dimensions, for example throughout the cargo loading and unloading periods. Outside said periods, the original girder or part thereof is back in its position and able to fulfill its functions.

In the case where, in conventional manner, there are mechanical connection elements between said structural girder or part thereof, which is initally removable or made to be so, and the next frame, said connection elements are made to be removable if they were not already so, in order to be able to mount them and dismount them at will, and means are provided within the said fixture for temporarily replacing said connecting elements. Thus, the device according to the invention permitting to temporarily enlarge the opening or hatch area of an aircraft structural frame, in particular at cargo loading and unloading times, said structural frame being of the type constituted of an annular underframe, reinforced by at least one structural girder sub-tending part of said underframe, is remarkable in that it comprises a fixture which can be temporarily fixed on said underframe with a view, on the one hand, to mechanically replacing said structural frame or part thereof and, on the other hand, enlarging the opening or hatch area of said frame to suit requirements, when said fixture is fitted to the underframe in place of said structural girder or part thereof.

Advantageously, the said fixture comprises an arc-shaped girder or the like, with at least one tie-brace, said tie-brace being designed to join the middle part of the fixture girder to the underframe, whereas means are provided to secure the ends of said fixture girder to said underframe in points close to the chord of the temporarily replaced structural girder.

To facilitate the positioning of said fixture girder, said latter can be made up of two joinable parts.

When structural rods are provided between the frame of which the opening or hatch area is to be enlarged and the next frame, the fixture is likewise provided with replacement fixture rods, which are removably connected to said tie-braces and/or to the middle part of said fixture girder.

As far as possible, the brackets and anchoring means initially provided on the underframes and on the structural frames are used for securing temporarily and removably the fixture according to the invention. For those securing points where such pre-existing brackets or anchoring means cannot be used, securing-by-clamping means are preferably used or fastening brackets forming part of said fixture and fixed either permanently or removably on the aircraft structural elements.

Preferably, to facilitate the fitting in and removing of the structural girder or of the fixture girder, said fixture is also provided with tension means adapted to be mounted in parallel on said structural girder.

BRIEF DESCRIPTION OF THE DRAWING

The invention will be more readily understood on reading the following description with reference to the accompanying drawings in which:

FIG. 1 is a diagrammatical side view of a transport aircraft equipped with a tail ramp, to which is applied the present invention.

FIG. 2 is a cross-section of the aircraft taken along line II—II of FIG. 1.

FIG. 3 is an elevational view of the upper part of the structural frame of the aircraft shown in FIGS. 1 and 2, taken at the level of the hinged connection of the tail ramp.

FIG. 4 is a plan view of the upper part of the structure of the aircraft shown in FIGS. 1 and 2, between the frame situated at the level of the hinged connection of the tail ramp and the frame immediately adjacent thereto, looking towards the tail of the aircraft.

FIGS. 5 and 6 illustrate by elevational and plan views corresponding to FIGS. 3 and 4 respectively, the embodiment of the invention.

FIG. 7 is a diagrammatical side view showing the fixture according to the invention when fitted between two adjacent frames.

FIG. 8 is a partial back view, in more details, of the fixture girder according to the invention.

FIGS. 9 and 10 are respectively cross-sections along lines IX—IX and X—X of FIG. 8.

FIG. 11 is a side view showing in detail the fitting of a tie-brace on a frame and how the fixture girder is secured to said tie-brace.

FIG. 12 is a front view of a tie-brace seen in the direction of arrow XII of FIG. 11, without the frame or the means securing it thereto.

FIG. 13 is a side view show the anchoring of the connecting rods of the fixture in the frame next to that on which said tie-braces are mounted.

FIG. 14 is a plan view of the anchoring illustrated in FIG. 13.

DESCRIPTION OF THE PREFERRED EMBODIMENT

Referring to the figures, these show that the transport aircraft 1, of a known type, to which the invention is applied, comprises a tail-end door 2 which is hinged on a transverse intermediate axis 3 of its fuselage 4, in order to be able to open downwards toward the rear of the aircraft. Said tail-end door 2 can occupy a closed position (shown in block lines in FIG. 1) in which it closes off a large loading hatch 5 and forms the lower part of the tail 6, or an open position 2' (shown in dot-and-dash lines in FIG. 1) in which it widely clears the said hatch 5 and can be used as a loading ramp, when the aircraft is on the ground. There is also a possibility, when the aircraft is air-bound, to open the door 2, to allow parachute-dropping operations for example. In this case, the door takes up a position 2" (shown in dotted lines) and is held open by lateral rods 7.

In conventional manner, the structure of the aircraft 1 is made up of spaced out transverse frames, joined together longitudinally and covered with the shell forming the fuselage 4. Said frames which give its mechanical strength to said fuselage, are each constituted by a peripheral section reinforced by girders sub-tending parts of said section.

Such structural girders, although they are mechanically indispensable, have therefore the disadvantageous effect of limiting the volume of space available inside the fuselage 4 of the aircraft 1.

As diagrammatically illustrated in FIG. 2, the space available in cross-section inside fuselage 4 is limited, in certain parts at least, to a rectangle 8, defined by the floor 9 and the inner chords 10 of said girders.

The frame 11 of the fuselage 4, situated vertically to the hinged connection 3 of the door 2 and therefore defining the maximum loading section of the transport aircraft 1, has the same structure as that described hereinabove.

FIG. 3 gives an illustration of the upper part of said frame 11, with the corresponding part of the peripheral section 12, sub-tended by an upper reinforcement girder 13. Said girder 13 comprises the inner chord 10 as well as trusses 14, joining said chord 10 to the peripheral section 12. It is therefore clear that the loading height inside the aircraft 1 is limited by girder 13.

The frame 11 further comprises brackets 15 integral with section 12, close to the ends of inner chord 10, and brackets 16 integral with said inner chord 10, close to the ends thereof. Said brackets are originally provided for anchoring the lateral rods 7, holding the door 2 in the open position 2".

In addition, the upper part of the frame 11 is joined to the upper part of frame 17 immediately next to frame 11, looking towards the tail of the aircraft 1, by structural rods 18 to 20, of general direction at least approximately longitudinal with respect to the aircraft 1. The structure of frame 17 is identical to that of frame 11 and the relative position of sections 12 and chords 10 of said adjacent frames 11 and 17 can be seen in FIG. 7; said figure shows in particular that, starting from frame 11 and going rearwards, the upper line of fuselage 4 of the illustrated transport aircraft 1, rises as illustrated in FIG. 1.

The embodiment of the invention described hereinafter is designed to increase the height of the free section inside the frame 11, which height was, until then, limited by the inner girder 10 of said frame 11.

To this effect, the invention proposes first of all to modify, permanently if necessary, the means 21 securing on the one hand, the trusses 14 to the section 12 of the frame 11, and on the other hand, the connecting rods 18, 19 and 20 to the frames 11 and 17. If said securing means 21 have not been designed by the aircraft constructor to be removable, they are replaced by removable securing means: for example, rivets are replaced by nut-and-screw assemblies. Likewise, if securing means 22 joining the chord 10 to section 12 were not initially removable, they would be replaced by securing means which are.

A fixture is also provided which comprises a girder 23, two tie-braces 24, two connecting rods 25, two connecting rods 26 and a tension device 27.

As diagrammatically illustrated in FIGS. 5 and 6 (which correspond to FIGS. 3 and 4 respectively), and in FIG. 7, first the two tie-braces 24 are secured by one of their ends to the section 12 of frame 11, whereas their other ends (being free) are directed inwardly of frame 11, but above the chord 10 thereof. Tie-braces 24 are arranged symmetrically with respect to the middle vertical plane of the fuselage 4, and their fitting is helped by marks painted for example on the peripheral section 12 of frame 11. Then, the laterally external rods 18, joining up frames 11 and 17 are removed.

Across the gap left by the removal of rods 18, is placed the girder 23, advantageously made up of two joinable elements. Said girder 23 is disposed crosswise and rests on the brackets 15 integral with section 12 of the frame 11.

Connecting rods 19 are then removed, and rods 25 and 26 of the fixture are fitted. Rods 25 connect the girder 23 to the chord 10 of the frame 17, whereas rods 26 connect said chord 10 to the upper end of tie-braces 24. Gussets 28 may be provided on the chord 10 of the frame 17 for securing the rods 25 and 26. Rods 25 and 26 are not shown in FIG. 5 for simplification purposes. After fitting said rods 25 and 26, rod or rods 20 are removed.

Then tension means 27 are placed between the two brackets 16 of the chord 10 of frame 11; said tension means are stretched and the means 22 securing the ends of the chord 10 to the brackets are removed. After that, the means 21 for securing the different elements of the trusses 14 to the peripheral section 12 of the frame 11, are also removed, and it is then possible to remove the girder 13.

Due to the fact that the shape of girder 23 is more concave than the chord 10 of frame 11, the fixture according to the invention enables to increase the free height of the frame 11. And considering the inclined loading direction F given by ramp 2', the gain in free height is indicated in FIG. 7 by the reference h.

When the loading of transport aircraft 1 is completed, the fixture 23 to 28 is removed by the reverse process and the structural girder 13 together with structural rods 18, 19 and 20 are put back into place.

As shown in FIGS. 5, 8, 9 and 10, the structure of the fixture girder 23 is box-like, said girder being arc-shaped. It is composed of two elements 23a and 23b which are symmetrical and joined together by a central sleeve 29 made up of two parts 29a and 29b, respectively fast with the corresponding element 23a or 23b. Each element 23a or 23b comprises an end portion 30a or 30b which is inclined, and a middle portion 31a and 31b which is horizontal. The horizontal middle portions 31a and 31b are the portions which can be interconnected by the central sleeve 29 and screws 32. A spindle 33 enables, when mounting the fixture and before fitting in the screws 32, to fix the exact relative position between the two elements 23a and 23b of the girder 23.

At the free ends of their portions 30a and 30b, the elements 23a and 23b comprise screws 34 adapted, on the one hand, to penetrate into corresponding holes provided in the iron fittings 15 and, on the other hand, to cooperate with screws 35 in order to secure the girder 23 to the frame 11. In this secured position, the horizontal middle element 31a, 31b of girder 23 is situated at a level higher than that of the chord 10 of the structural girder 13.

On the front face of said horizontal middle portions 31a and 31b, the girder 23 is provided with threaded holes 36 for securing the base of the tie-braces 24 (see FIG. 11). On the back face of said middle portions 31a and 31b are provided lugs or yoke members 37 for fixing the rods 25.

Each tie-brace 24 is provided, at its upper part, with jaws 38, 39 capable of gripping part of the section 12 of the frame 11, for securing said tie-brace to said section. Said jaws 38 and 39 can be clamped together by means of screws 40, going through holes 41 provided in the head 42 of said tie-brace 24. Said head 42 further comprises a gusset 43 for securing a rod 26.

The base 44 of each tie-brace 24 is perforated with holes 45 for the passage of screws (not shown) which can be screwed into the threaded holes 36 of girder 23.

The gussets 28 for securing the rods 25 and 26 on the structural frame 17 can themselves be fixed on iron fittings 46 originally provided for fixing the structural rods 18, 19 and 20 (see FIGS. 13 and 14).

With the fixture illustrated in FIGS. 8 to 14, the replacement of the structural girder 13 and of the structural rods 18, 19 and 20 by said fixture, can be carried out as follows:

first, the tie-braces 24 are positioned on the section 12 of the frame 11 and said tie-braces are secured thereon by the action of the jaws 38, 39 and screws 40;

the lateral structural rods 18 are removed after removing their removable securing means 21 which secure them to the frames 11 and 17;

the two elements 23a and 23b of the fixture girder 23 are separately introduced through the free gap left by the removal of structural rods 18, then the end screws 34 of said elements 23a and 23b are introduced into the corresponding holes provided in the brackets 15 and the two elements 23a and 23b are assembled by means of a spindle 33. Then, the screws 32 securing the two elements 23a and 23b are screwed in, and the nuts 35 are screwed on the screws 34, without being tightened.

the structural rods 19 are removed and the gussets 28 are mounted on their iron fittings 46. The rods 25 are fitted between the lugs 37 and the gussets 28, and the rods 26 between the gussets 43 and the gussets 28;

the structural rods 20 are removed;

the tension means 27 are placed between the lugs 16 of the chord 10 of the frame 11, the means 22 securing said chord on the section 12 are loosened, and said tension means are stretched until the securing means 12 are released;

the means 21 securing the trusses 14 to the section 12 are removed;

the securing means 22 are removed;

the girder 13 is removed and the nuts 35 are locked in position.

The fixture girder 23 and fixture rods 25, 26 then replace mechanically the structural girder 13 and the structural rods 18, 19 and 20, but they define a higher dimension upright of the frame 11.

To restore the original structure of the aircraft 1:

the girder 13 equipped with its tension means 27 is presented and the means 22 for securing it to the section 12, are engaged;

the fastening means 21 are fitted back between the girder 13 and the section 12;

the fixture rods 25 and 26 and gussets 28 are removed;

the structural rods 19 and 20 are fitted back;

the two elements of the fixture girder 23 are disconnected;

the tie-braces 24 are removed;

the nuts 35 are removed as well as the elements 23a and 23b of the girder 23;

the rods 18 are fitted back; and the means 22 securing the structural girder 13 to the section 12 are tightened.

The transport aircraft 1 has thus resumed its initial structure.

We claim:

1. In a transport aircraft having a tail-end door and a body comprising spaced transverse structural frames joined together longitudinally, said tail-end door being hinged on said body at the lower part of one of said structural frames defining a loading-unloading section of said transport aircraft, said one structural frame comprising an annular underframe, of which an upper part is reinforced by at least one structural girder subtending said upper part of said underframe, an improvement for temporarily increasing the effective size of said loading-unloading section comprising a removable fixture adapted to be temporarily fixed on said upper part of said one structural frame in place of said structural girder, said fixture mechanically replacing said structural girder during loading-unloading operations and providing an enlargement for said loading-unloading section.

2. The improvement of claim 1, for a transport aircraft in which structural connection members are provided between said structural girder and a transverse structural frame adjacent to said one structural frame, wherein said fixture comprises means for temporarily replacing said structural connection members.

3. The improvement of claim 1, wherein said fixture comprises a girder which is arcuate, and at least one tie-brace adapted to connect the middle part of said fixture girder to the underframe, and means for securing to said underframe the ends of said fixture girder at points close to those of the chord of the temporarily replaced structural girder.

4. The improvement of claim 3, wherein the fixture girder comprises two joinable elements.

5. The improvement of claim 3, adapted for use in an aircraft in which structural connecting rods are provided between the structural frame of which the opening area has to be enlarged, and an adjacent structural frame, the fixture further comprising replacement fixture rods which are removably joined to said tie-braces and to said adjacent structural frame.

6. The improvement of claim 5 wherein said fixture further comprises replacement rods, which are removably connected to the fixture girder and to said adjacent structural frame.

7. The improvement of claim 3, wherein said fixture is adapted for using already existing anchoring means on said structural frame.

8. The improvement of claim 3, wherein said fixture comprises clamping means for securing said fixture in position on said structural frame.

9. The improvement of claim 3, wherein said fixture further comprises tension means adapted to be mounted in parallel on said structural girder.

* * * * *